United States Patent
Taylor et al.

(10) Patent No.: US 8,966,173 B1
(45) Date of Patent: Feb. 24, 2015

(54) MANAGING ACCESSES TO STORAGE OBJECTS

(75) Inventors: Alan L. Taylor, Cary, NC (US); Michael D. Haynes, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 87 days.

(21) Appl. No.: 13/535,981

(22) Filed: Jun. 28, 2012

(51) Int. Cl.
*G06F 12/14* (2006.01)

(52) U.S. Cl.
USPC .......................................... 711/114; 711/163

(58) Field of Classification Search
CPC . G06F 3/0689; G06F 11/1076; G06F 3/0632; G06F 3/067; G06F 3/061; H05K 999/99
USPC .................................................. 711/114, 163
See application file for complete search history.

(56) References Cited

U.S. PATENT DOCUMENTS

2006/0041656 A1\* 2/2006 Li et al. .......................... 709/223
2007/0136496 A1\* 6/2007 Hendel et al. ..................... 710/6

\* cited by examiner

*Primary Examiner* — Yong Choe
(74) *Attorney, Agent, or Firm* — Krishnendu Gupta; Jason A. Reyes

(57) ABSTRACT

A method is used in managing accesses to storage objects. Access I/Os being directed to at least one storage object are received into a first queue that operates on a first in first out basis. In accordance with the first in first out basis, a batch of the access I/Os is created from the first queue. The batch is transferred to a second queue that is controlled by ordering logic. The batch in the second queue is ordered in accordance with the ordering logic. All of the access I/Os from the second queue are processed in order, before any additional access I/Os are added to the second queue.

8 Claims, 3 Drawing Sheets

MANAGING ACCESSES TO STORAGE OBJECTS

BACKGROUND

1. Technical Field

This application relates to managing accesses to storage objects.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A traditional storage array (herein also referred to as a "data storage system", "disk storage array", "disk array", or simply "array") is a collection of hard disk drives operating together logically as a unified storage device. Storage arrays are designed to store large quantities of data. Storage arrays typically include one or more storage array processors (SPs), for handling requests for allocation and input/output (I/O) requests. An SP is the controller for and primary interface to the storage array.

A storage array may be thought of as a system for managing a large amount of a resource, i.e., a large number of disk drives (also referred to as "disks" or "drives"). Management of the resource may include allocation of a portion of the resource in response to allocation requests. In the storage array example, portions of the storage array may be allocated to, i.e., exclusively used by, entities that request such allocation.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units ("logical volumes" or "LUNs"). The logical disk units may or may not correspond to the actual disk drives. Allowing multiple host systems to access the single storage device unit allows the host systems to share data in the device. In order to facilitate sharing of the data on the device, additional software on the data storage systems may also be used.

Performance of a storage system can be characterized by the system's total capacity, response time, throughput, and/or various other metrics. The capacity of a storage system is the maximum total amount of data that can be stored on the system. The response time of a storage system is the amount of time required to read data from or write data to the storage system. The throughput of a storage system is a measure of the amount of data that can be transferred into or out of (i.e., written to or read from) the storage system over a given period of time.

The administrator of a storage array can desire to optimize the storage system in a manner that maximizes performance or balances cost vs. performance. In general, performance of a storage system can be constrained by both physical and temporal constraints. Examples of physical constraints include bus occupancy and availability, excessive disk arm movement, and uneven distribution of load across disks or across RAID groups (which are described below). Examples of temporal constraints include bus bandwidth, bus speed, spindle rotational speed, serial versus parallel access to multiple read/write heads, and the size of data transfer buffers.

One factor that can limit the performance of a storage system is the performance of each individual storage device. For example, the read access time of a storage system including hard disk drives is constrained by the access time of the disk drive from which the data is being read. Read access time can be affected by physical characteristics of the disk drive, such as the number of revolutions per minute of the spindle: the faster the spin, the less time it takes for the sector being read to come around to the read/write head.

Furthermore, even if a disk-based storage system uses the fastest disks available, the performance of the storage system can be limited by the number of those disks that can be accessed at a time. In other words, performance of a storage system, whether it is an array of disks, tapes, flash drives, or other storage devices, can also be limited by system constraints, such the number of data transfer buses available in the system and the density of traffic on each bus.

In the industry there have become defined several levels of RAID systems that may be used by groups of disks referred to as RAID groups. RAID (Redundant Array of Independent or Inexpensive Disks) parity schemes may be utilized to provide error detection during the transfer and retrieval of data across a storage system. The first level, RAID-0, combines two or more drives to create a larger virtual disk. In a dual drive RAID-0 system one disk contains the low numbered sectors or blocks and the other disk contains the high numbered sectors or blocks, forming one complete storage space. RAID-0 systems generally interleave the sectors of the virtual disk across the component drives, thereby improving the bandwidth of the combined virtual disk. Interleaving the data in that fashion is referred to as striping. RAID-0 systems provide no redundancy of data, so if a drive fails or data becomes corrupted, no recovery is possible short of backups made prior to the failure.

RAID-1 systems include one or more disks that provide redundancy of the virtual disk. One disk is required to contain the data of the virtual disk, as if it were the only disk of the array. One or more additional disks contain the same data as the first disk, providing a "minor" of the data of the virtual disk. A RAID-1 system will contain at least two disks, the virtual disk being the size of the smallest of the component disks. A disadvantage of RAID-1 systems is that a write operation must be performed for each minor disk, reducing the bandwidth of the overall array. In a dual drive RAID-1 system, the first disk and the second disk contain the same sectors or blocks, each disk holding exactly the same data.

RAID-2 systems provide for error correction through hamming codes. The component drives each contain a particular bit of a word, or an error correction bit of that word. RAID-2 systems automatically and transparently detect and correct single-bit defects, or single drive failures, while the array is running. Although RAID-2 systems improve the reliability of the array over other RAID types, they are less popular than some other systems due to the expense of the additional drives, and redundant onboard hardware error correction.

RAID-4 systems are similar to RAID-0 systems, in that data is striped over multiple drives. For example, the storage spaces of two disks are added together in interleaved fashion, while a third disk contains the parity of the first two disks. RAID-4 systems are unique in that they include an additional disk containing parity. For each byte of data at the same position on the striped drives, parity is computed over the bytes of all the drives and stored to the parity disk. The XOR operation is used to compute parity, providing a fast and symmetric operation that can regenerate the data of a single drive, given that the data of the remaining drives remains intact.

RAID-3 systems are essentially RAID-4 systems with the data striped at byte boundaries, and for that reason RAID-3 systems are generally slower than RAID-4 systems in most applications. RAID-4 and RAID-3 systems therefore are useful to provide virtual disks with redundancy, and additionally to provide large virtual drives, both with only one additional disk drive for the parity information. They have the disadvantage that the data throughput is limited by the throughput of the drive containing the parity information, which must be accessed for every read and write operation to the array.

RAID-5 systems are similar to RAID-4 systems, with the difference that the parity information is striped over all the disks with the data. For example, first, second, and third disks may each contain data and parity in interleaved fashion. Distributing the parity data generally increases the throughput of the array as compared to a RAID-4 system. RAID-5 systems may continue to operate though one of the disks has failed. RAID-6 systems are like RAID-5 systems, except that dual parity is kept to provide for normal operation if up to the failure of two drives.

Combinations of RAID systems are also possible. For example, a four disk RAID 1+0 system provides a concatenated file system that is also redundant. The first and second disks are mirrored, as are the third and fourth disks. The combination of the mirrored sets forms a storage space that is twice the size of one individual drive, assuming that all four are of equal size. Many other combinations of RAID systems are possible.

Software logic executing on a data storage system may send data input/output (I/O) requests to a RAID group. The software logic utilizes a device driver associated with the RAID group for sending the I/O requests, and receiving any corresponding responses. A device driver is a software or firmware that contains the information necessary for communicating with a specific hardware device or system. In commonly used data storage systems, the software logic sends a request to the device driver, and the device driver sends a corresponding request to the device or system. Any response from the device to the software logic may traverse the same path in reverse order.

Device drivers for data storage devices employ certain techniques for processing the I/O requests for the RAID group. For example, a data storage device driver may use a queue data structure to queue up the I/O requests received from elsewhere in the data storage system. The data storage device driver processes the I/O requests on a first in first out (FIFO) basis for the RAID group.

SUMMARY OF THE INVENTION

A method is used in managing accesses to storage objects. Access I/Os being directed to at least one storage object are received into a first queue that operates on a first in first out basis. In accordance with the first in first out basis, a batch of the access I/Os is created from the first queue. The batch is transferred to a second queue that is controlled by ordering logic. The batch in the second queue is ordered in accordance with the ordering logic. All of the access I/Os from the second queue are processed in order, before any additional access I/Os are added to the second queue.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in managing accesses to storage objects. In at least one implementation, the technique may be used to help provide, among other things, a method for LBA ordering requests in a disk array.

For example, a mapped LUN driver (MLU) presents a virtual volume, e.g., a thin LUN (TLU) or direct LUN (DLU), to a host, which virtual volume is backed by one or more traditional logical volumes (FLUs). Each FLU resides in a RAID group that is composed of several physical disks. MLU maintains a RAID group queue to prevent one virtual volume from overwhelming the backend resources (RAID groups and disks). To accomplish this, MLU counts how many requests are in progress to a RAID group. If the number of requests exceeds the known limits of the underlying physical disks in the RAID group, MLU defers processing the request. Once an in-progress request to the RAID group completes, MLU issues the next request in the RAID group queue.

In standard form, the RAID group queue is managed as a FIFO queue.

By contrast, in accordance with the technique described herein, the RAID group queue is enhanced as described below such that the RAID group queue is ordered by FLU and then by the logical block address (LBA), using a double queue technique that employs an incoming queue and an ordered queue. Requests are always inserted on the tail of the incoming queue. Requests are always removed from the head of the ordered queue. If the ordered queue is empty, MLU populates the ordered queue from the incoming queue. In an optimization of the enhancement, the tail of the ordered queue is first inspected during population. If the requests are issued in-order, the inspection results in insertion to the tail of the ordered list. The optimization helps to prevent a full list traversal in the in-order request case. Such batch processing can help to match a burst load that occurs with some internal metadata operations. This enhancement helps to avoid starvation by making forward progress so that requests are not excessively delayed in the incoming queue.

In standard, unenhanced form, the MLU managed RAID group queue is a simple FIFO queue, which helps prevent backend resources from becoming overwhelmed, but does not factor in the workload. Some modern disks LBA order incoming requests, but in some situations the RAID group queue depth grows beyond the size that is issued to the disks, so the disks can only LBA order small batches of the requests.

By contrast, MLU has more information about the entire range of requests than any other component in the system, and can provide a comprehensive ordering. Accordingly, the enhanced RAID group queue has LBA ordering by which MLU reduces the amount of disk head seeking that occurs, which increases the overall performance of the disk array.

Figure 1:
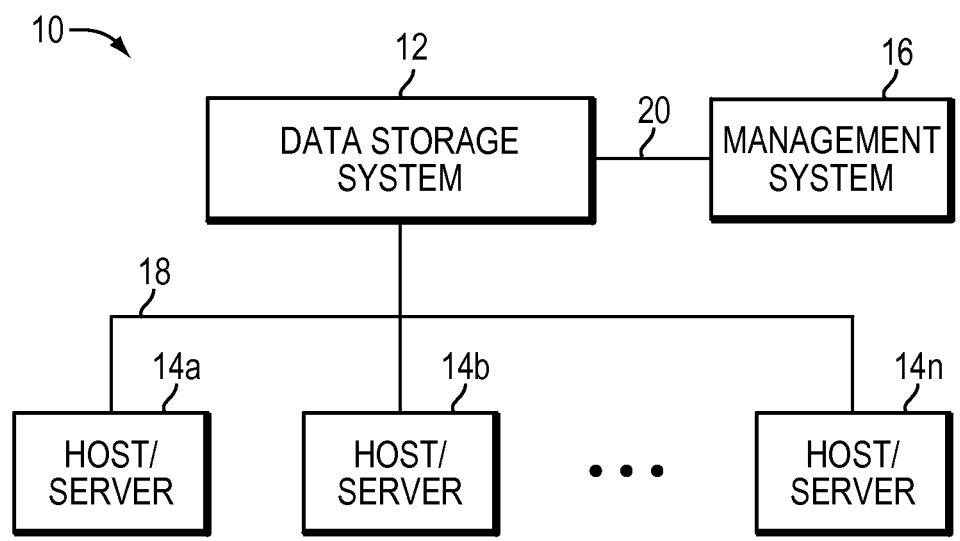
FIGS. 1-3 are block diagrams of an example of an embodiment of a computer system that may be used with the techniques described herein.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage system 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host/server computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host/server computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host/server computer systems may perform different types of data operations in accordance with different types of tasks. In the embodiment of FIG. 1, any one of the host/server computers 14a-14n may issue a data request to the data storage systems 12 to perform a data operation. For example, an application executing on one of the host/server computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host/server computer systems, for example, to the data storage systems 12.

It should be noted that each of the data storage systems may operate stand-alone, or may also be included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

Figure 2:
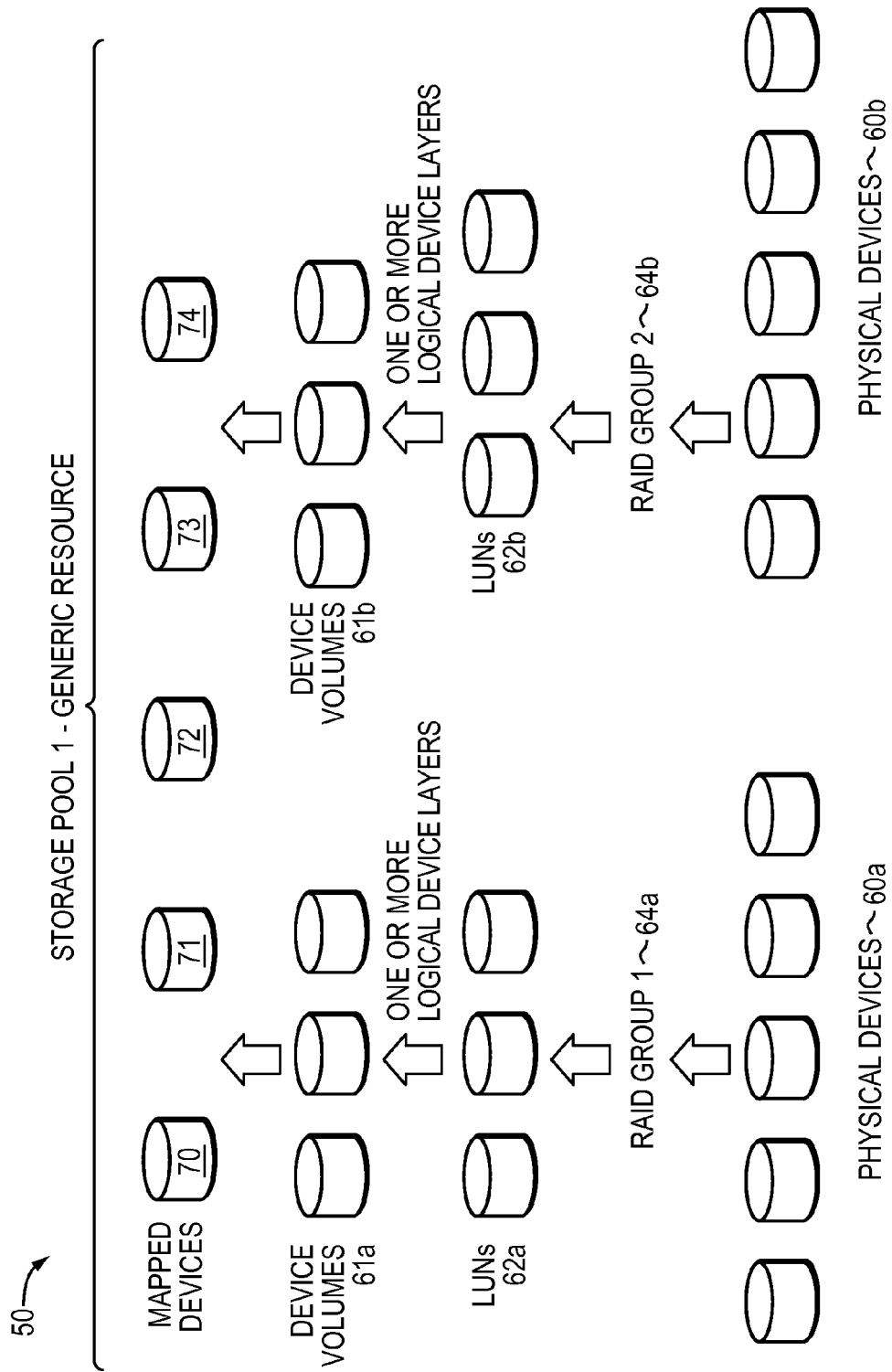

Referring to FIG. 2, shown is an example representing how data storage system best practices may be used to form storage pools. The example 50 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used to form a storage pool in an embodiment using RAID techniques.

The data storage system 12 may also include one or more thin devices 70-74. A thin device (also referred to as "thin logical unit" or "thin LUN") presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists, referred to as slices above, are mapped to data devices such as device volumes 61a-61b, which are logical devices that map logical storage space of the data device to physical storage space on the physical devices 60a-60b. Thus, an access of the logical storage space of the thin device results in either a null pointer (or equivalent) indicating that no corresponding physical storage space has yet been allocated, or results in a reference to a data device which in turn references the underlying physical storage space. Further, a mapped LUN (e.g., mapped devices 70-74) may either be a direct mapped logical unit or thin logical unit.

Figure 3:
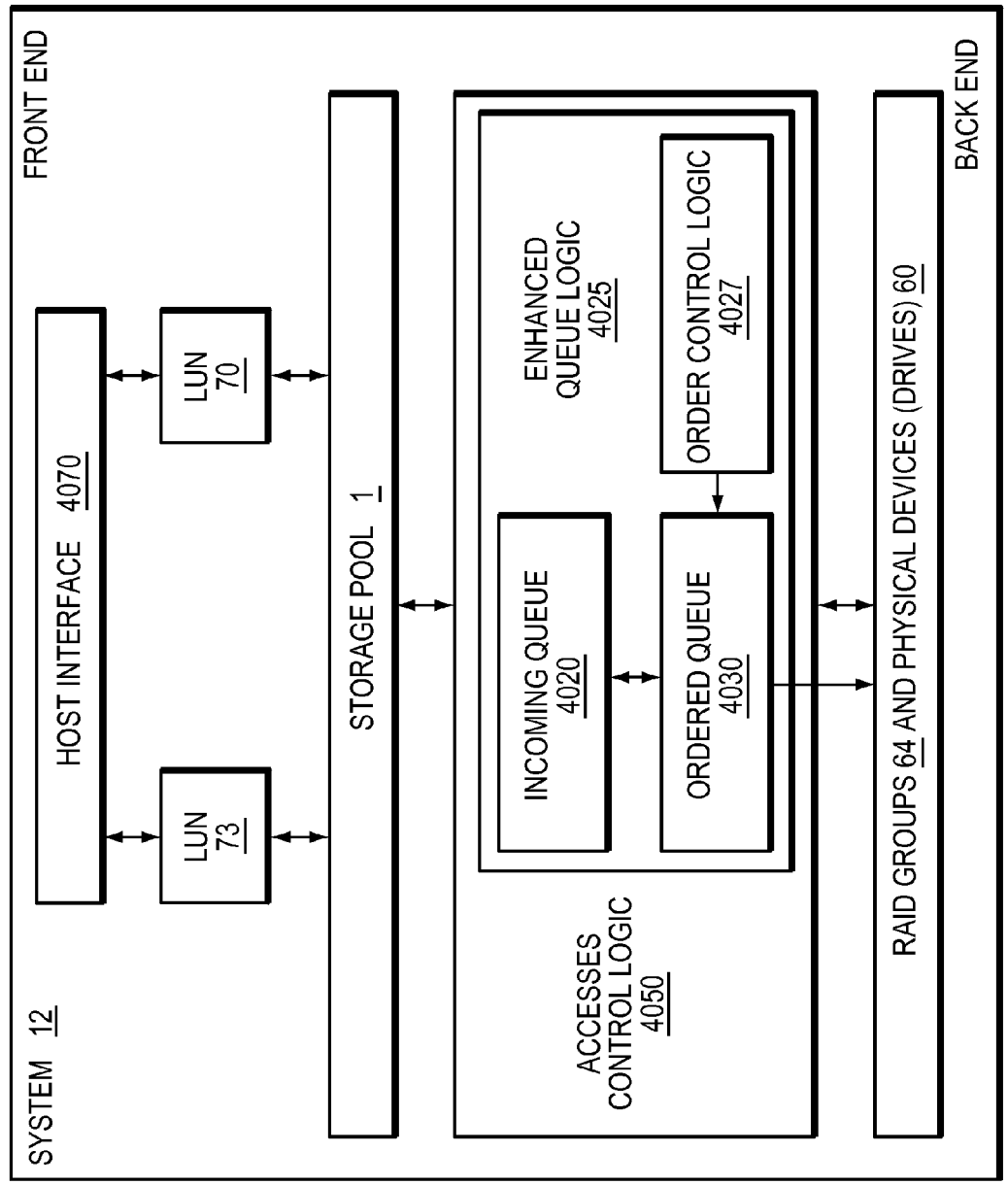

FIG. 3 illustrates an example implementation using the technique described herein.

System 12 has LUNs 73, 70, pool 1, and, at its back end, RAID groups 64 and drives 60 described above. At its front end, system 12 also has host interface 4070 for communicating with hosts 14a-14n described above.

System 12 also has control logic 4050 that, based on characteristics of groups 64 and devices 60, controls how many accesses (I/Os) should be allowed to flow to each of groups 64 and devices 60 for processing.

In particular, logic 4050 has enhanced queue logic 4025 that includes incoming queue 4020 and ordered queue 4030, and order control logic 4027 that controls ordering within queue 4030 as described below.

In at least one implementation, accesses bound for groups 64 and devices 60 first enter the tail of incoming queue 4020. Queue 4020 operates on a first-in-first-out basis wherein the first to enter the tail is the first to exit the head of queue 4020. Accesses are transferred to ordered queue 4030 in batches from the head of queue 4020, so that, for example, if queue 4020 has a depth of 10, when queue 4030 empties out, 10 accesses are transferred from the head of queue 4020 to queue 4030.

Logic 4027 causes the accesses within queue 4030 to be ordered, e.g., before the accesses are released to groups 64 and devices 60 for processing. The ordering may be performed in one or more ways for one or more purposes. For example, the accesses may be ordered for faster processing by groups 64 and devices 60; if devices 60 are traditional spinning hard drives or optical drives, the accesses may be ordered by LUN 62 and LBA to avoid excessive head movement. This example is based on the recognition that accessing adjacent or nearby data blocks on a data storage device is a more efficient way of accessing data than accessing randomly ordered data blocks. Such ordering may also serve other purposes; for the heads of spinning hard drives or optical drives, physically reaching widely dispersed data blocks is a time consuming process, and accessing widely dispersed data blocks increases the wear and tear on the drives.

In other examples, accesses may be ordered for load balancing, by type (e.g., read versus write), by content, by security level, by importance or service level agreement (SLA) or quality of service (QoS) priority, by size, by source (e.g., host or application), by ultimate destination (e.g., through archiving or federating), by policy, by access activity (e.g., last access or access frequency), and/or by cost.

Once ordered, accesses of queue 4030 are processed in order by groups 64 and devices 60. Once empty, queue 4030 is refilled from the head of queue 4020.

Use of the two queues 4020, 4030 helps to avoid a queue problem referred to as starvation. Starvation refers to an access waiting an exceedingly long period of time to enter and/or traverse a queue for processing; in busy systems the lowest priority access is "starved out" because it never makes it to the priority level that is needed to be processed. If only queue 4030 were used, an access which had a low priority in an ordering scheme used by logic 4027 might not traverse the queue until all higher priority accesses, which may continue arriving in the meantime, have completed processing. Starvation can significantly reduce the performance of a system performing multiple concurrent accesses and can reduce the effectiveness with which multiple concurrent accesses are processed. In the system of FIG. 3, starvation is avoided by ordering only fixed batches of accesses, so that an access in an earlier batch cannot be treated as lower priority than an access in a later batch.

The performance of queues 4020, 4030 may depend on characteristics of system 12 and of groups 64 and devices 60. For example, a RAID group that is high performance (e.g., because it includes many high performance disks) may be able to handle a relatively high number of concurrent accesses, which may correspond to a large queue 4030 that can transfer a large batch of accesses to the RAID group.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing accesses to storage objects, the method comprising:
   receiving access I/Os directed to at least one storage object into a first queue, wherein the first queue operates on a first in first out basis;
   in accordance with the first in first out basis of the first queue, creating a batch of the access I/Os from head of the first queue, wherein the number of the access I/Os in the batch is based on characteristics of the at least one storage object;
   transferring the batch of the access I/Os from the first queue to a second queue that is controlled by ordering logic;
   ordering the batch in the second queue in accordance with the ordering logic, wherein the ordering logic orders the access I/Os in the batch by logical volume and logical block address; and
   processing all of the access I/Os from the second queue in order, before adding any additional access I/Os from the first queue to the second queue.

2. The method of claim 1, wherein the storage object is backed by at least one traditional logical volumes residing in a RAID group that is composed of physical disks.

3. The method of claim 1, wherein the access I/Os are inserted on tail of the first queue and are removed from head of the second queue.

4. The method of claim 1, wherein control logic controls how many of the access I/Os should be allowed to flow to the storage object for processing.

5. A system for use in managing accesses to storage objects, the system comprising:
   first logic receiving access I/Os directed to at least one storage object into a first queue, wherein the first queue operates on a first in first out basis;
   second logic creating, in accordance with the first in first out basis of the first queue, a batch of the access I/Os from head of the first queue, wherein the number of the access I/Os in the batch is based on characteristics of the at least one storage object;
   third logic transferring the batch of the access I/Os from the first queue to a second queue—that is controlled by ordering logic;
   fourth logic ordering the batch in the second queue in accordance with the ordering logic, wherein the ordering logic orders the access I/Os in the batch by logical volume and logical block address; and
   fifth logic processing all of the access I/Os from the second queue in order, before adding any additional access I/Os from the first queue to the second queue.

6. The system of claim 5, wherein the storage object is backed by at least one traditional logical volumes residing in a RAID group that is composed of physical disks.

7. The system of claim 5, wherein the access I/Os are inserted on tail of the first queue and are removed from head of the second queue.

8. The system of claim 5, wherein control logic controls how many of the access I/Os should be allowed to flow to the storage object for processing.

* * * * *